G. H. POWELL.
CHILD'S CAB OR CARRIAGE.
APPLICATION FILED AUG. 29, 1906.

997,325.

Patented July 11, 1911.

6 SHEETS—SHEET 1.

Witnesses:
Geo. H. Morse.
Charles I. Cobb

Inventor:
Guy H. Powell
by Hill & Hill
Att'ys.

G. H. POWELL.
CHILD'S CAB OR CARRIAGE.
APPLICATION FILED AUG. 29, 1906.

997,325.

Patented July 11, 1911.
6 SHEETS—SHEET 2.

Witnesses:
Geo. H. Morse.
Charles J. Cobb

Inventor:
Guy H. Powell
by Hill & Hill,
Att'ys.

G. H. POWELL.
CHILD'S CAB OR CARRIAGE.
APPLICATION FILED AUG. 29, 1906.
997,325.
Patented July 11, 1911.
6 SHEETS—SHEET 3.
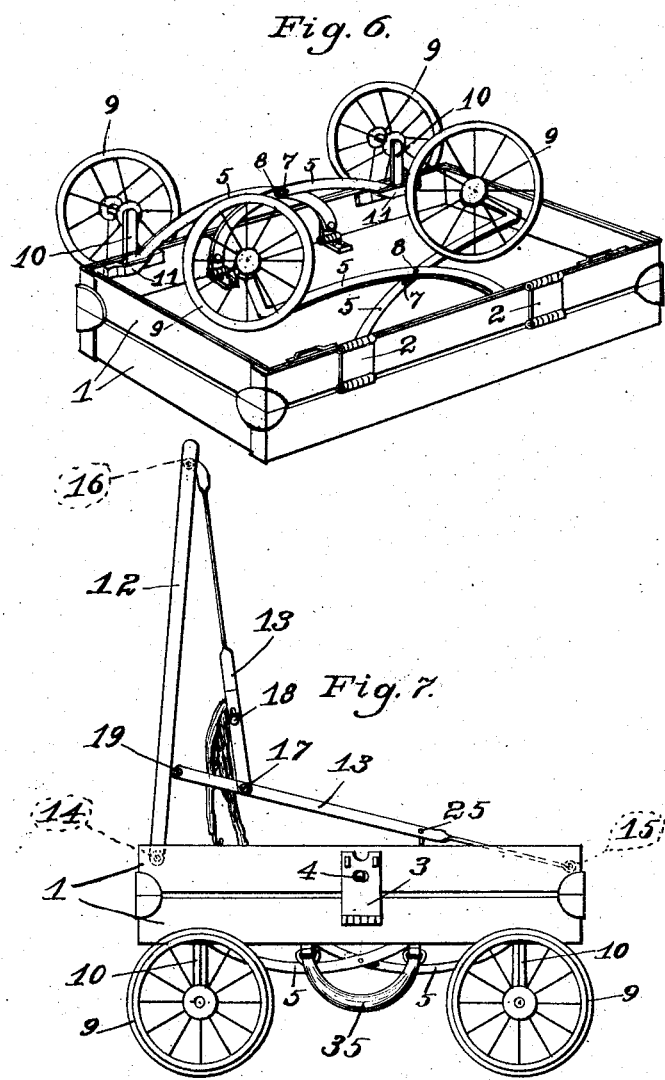
Witnesses:
Geo. H. Morse.
Charles J. Cobb
Inventor:
Guy H. Powell
by Hill & Hill,
Attys.

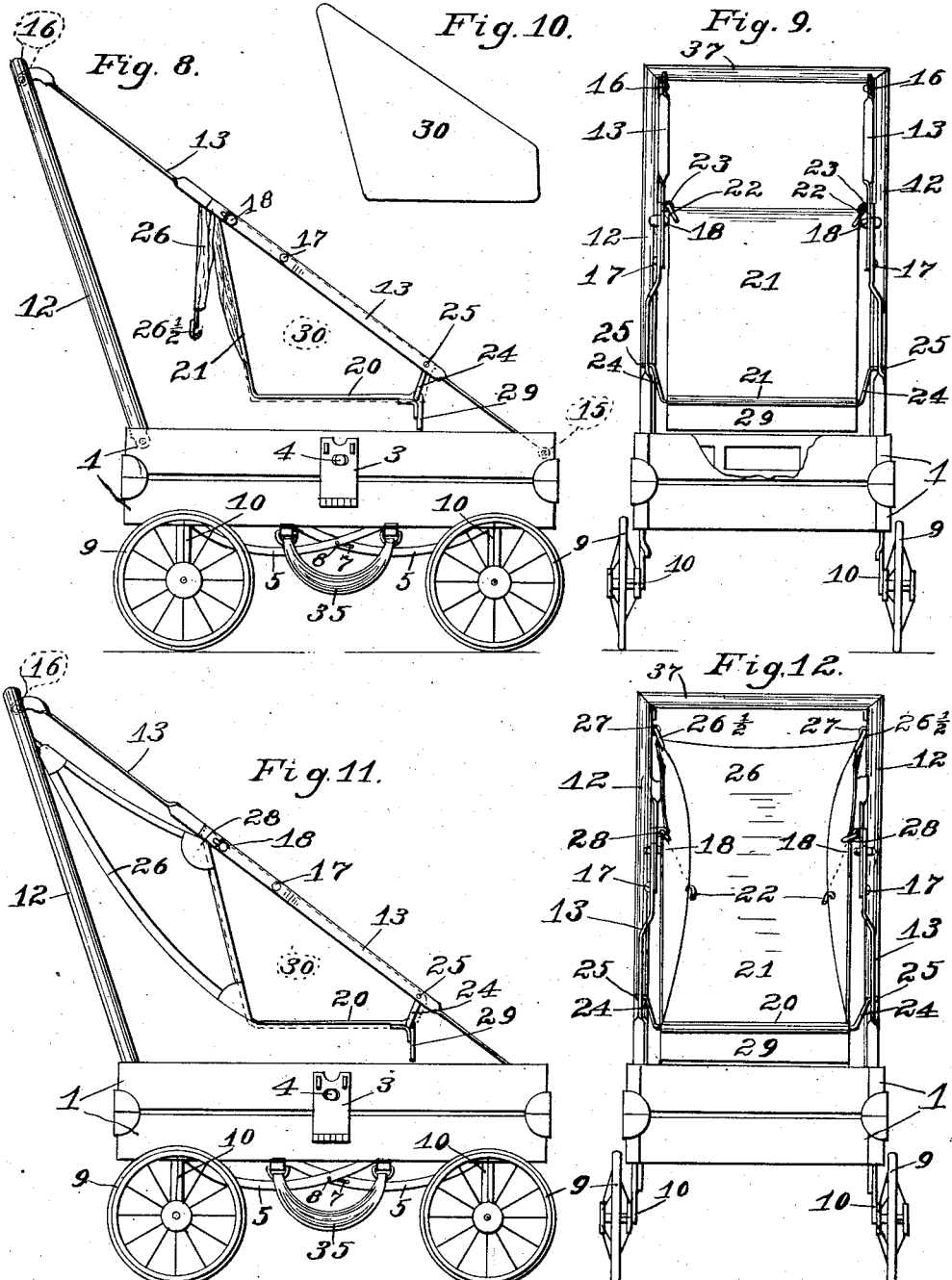

G. H. POWELL.
CHILD'S CAB OR CARRIAGE.
APPLICATION FILED AUG. 29, 1906.
997,325.
Patented July 11, 1911.
6 SHEETS—SHEET 5.
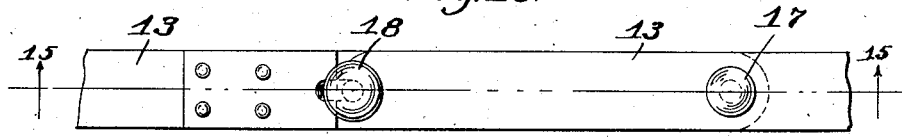
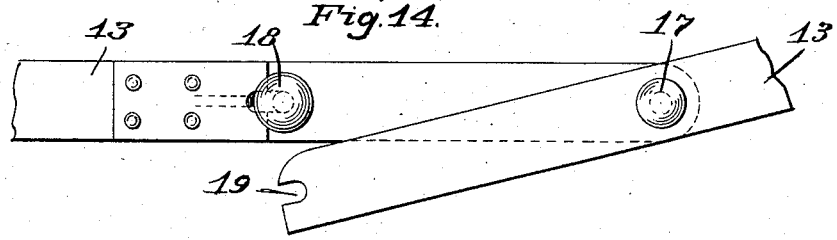
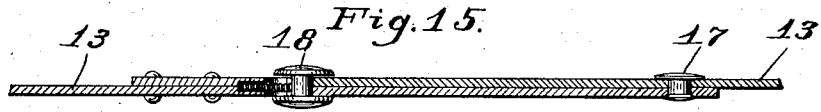
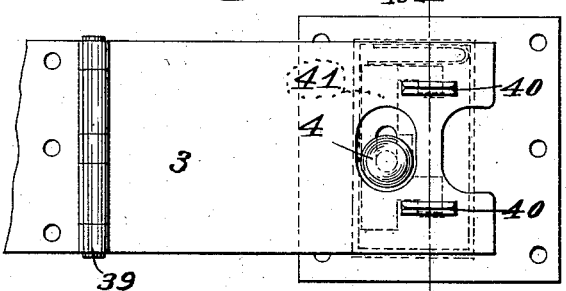
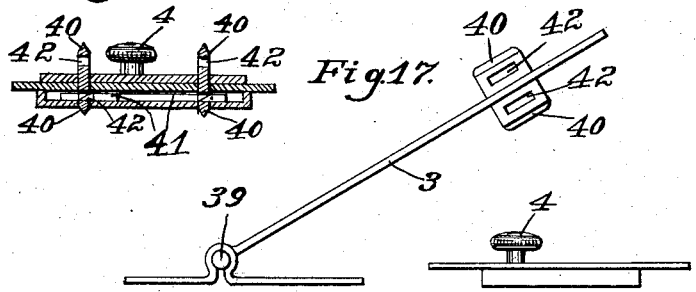
Witnesses:
Geo. H. Morse.
Charles J. Cobb.
Inventor:
Guy H. Powell
By Hill & Hill,
Att'ys.

G. H. POWELL.
CHILD'S CAB OR CARRIAGE.
APPLICATION FILED AUG. 29, 1906.

997,325.

Patented July 11, 1911.
6 SHEETS—SHEET 6.

Witnesses:
Geo. H. Morse.
Charles I. Cobb

Inventor:
Guy H. Powell
by Hill & Hill
Att'ys.

UNITED STATES PATENT OFFICE.

GUY H. POWELL, OF CHICAGO, ILLINOIS, ASSIGNOR, BY DIRECT AND MESNE ASSIGNMENTS, TO POWELL SUIT-CASE GO-CART CO., OF STURGIS, MICHIGAN, A CORPORATION OF MICHIGAN.

CHILD'S CAB OR CARRIAGE.

997,325.       Specification of Letters Patent.    Patented July 11, 1911.

Application filed August 29, 1906. Serial No. 332,416.

*To all whom it may concern:*

Be it known that I, GUY H. POWELL, a citizen of the United States, residing at Chicago, county of Cook, and State of Illinois, have invented certain new and useful Improvements in Children's Cabs or Carriages, of which the following is a description.

My invention belongs to that general class of baby carriages or devices of the kind which are constructed to collapse or fold into a small space for convenience in transporting the same when not in use for the purposes for which they are constructed.

It has for its object the construction of an exceedingly attractive, and effective device for the purpose stated, convenient in use and durable in construction, and to this end it consists in the novel construction, arrangement and combination of parts herein shown, described, and more particularly pointed out in the claims.

Figure 1:
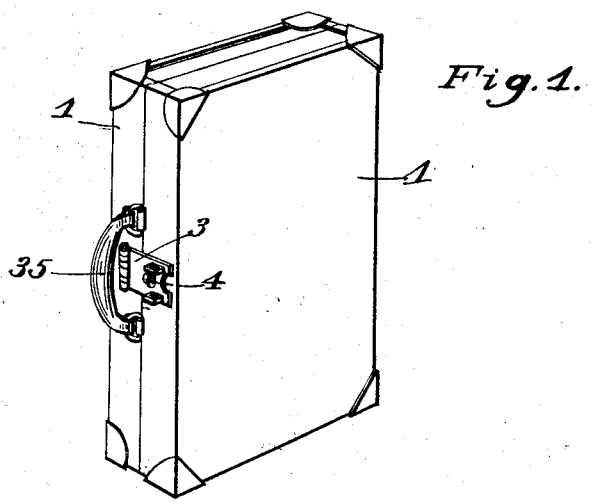
Figure 2:
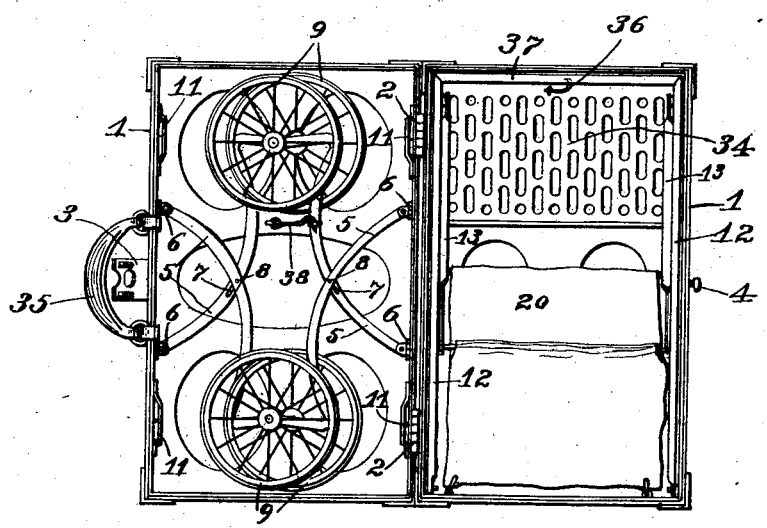
Figure 3:
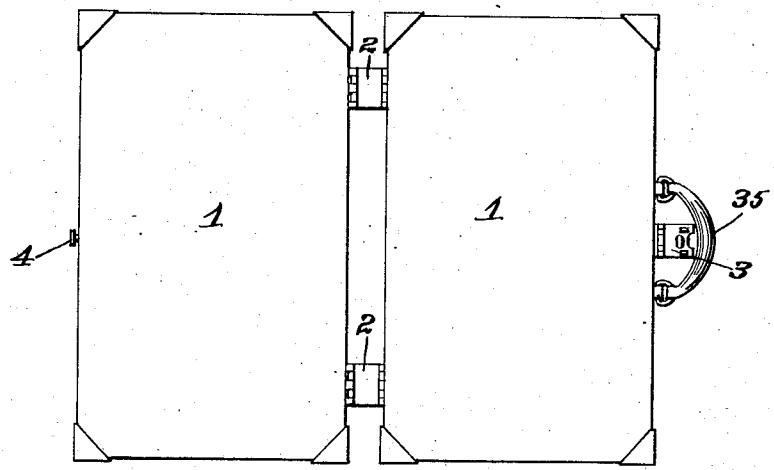
Figure 5:
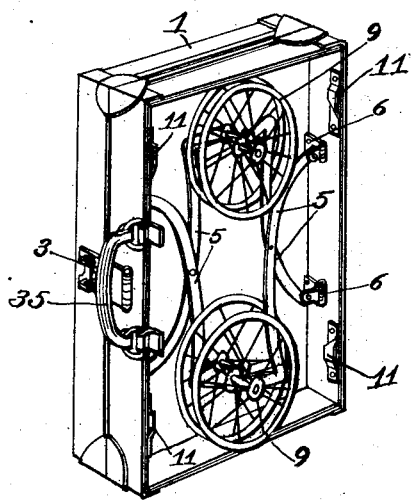
Figure 4:
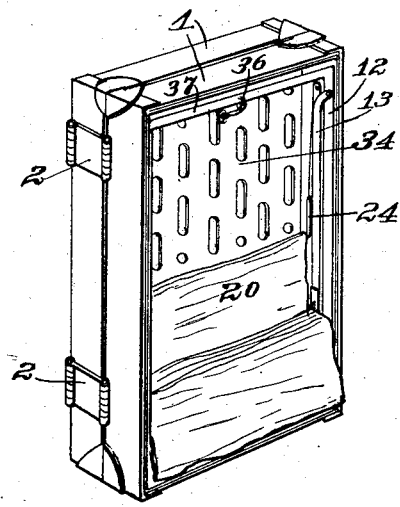
Figure 19:
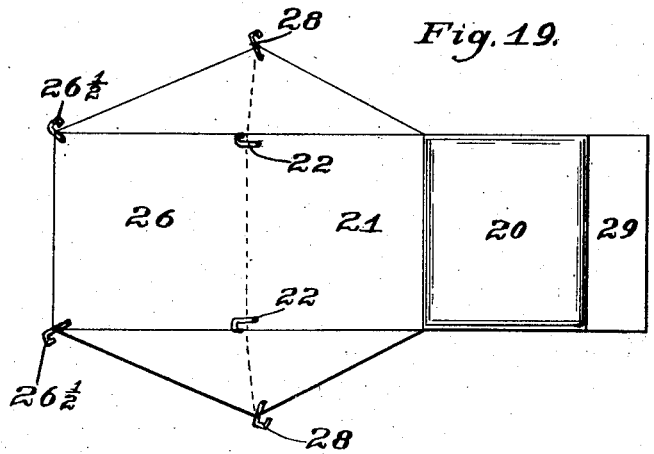
Figure 20:
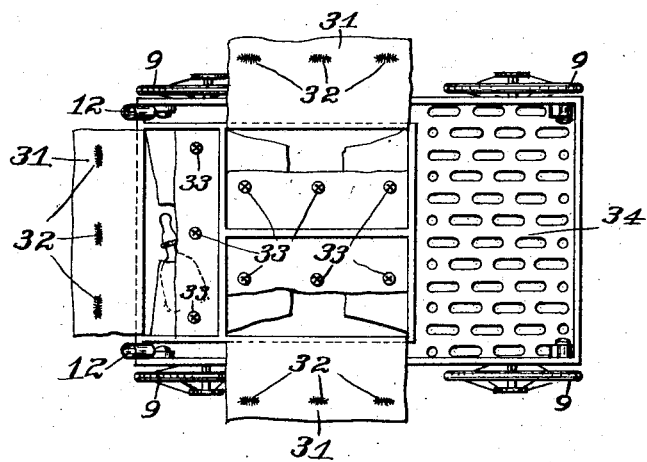

In the drawings, wherein like or corresponding reference characters indicate like or corresponding parts,—Figure 1 is a perspective view of my invention closed and ready for transportation. Fig. 2 is a front view of the same, partly open to show the arrangement and construction. Fig. 3 is a back view of the same. Fig. 4 shows the two parts of the body locked back to back in position for assembling for use, and displaying the seat side. Fig. 5 is a similar view showing the opposite or wheel side of the device. Fig. 6 shows the wheel side with one pair of wheels in position for use and the other pair partially raised to indicate the construction. Fig. 7 shows the device resting upon its wheels with the seat and propelling frame partly open. Fig. 8 shows the device completely open and in position for use with the seat in position for the child to sit upright. Fig. 9 is a front view of the same, with the parts partially broken away. Fig. 10 is a side view of a preferred form of side closure for the seat. Fig. 11 is a side elevation corresponding to Fig. 8 showing the seat in position to permit the child to assume a partly reclining position. Fig. 12 is a front view of the same with the seat braces broken away to show the construction. Figs. 13, 14 and 15 are detail views of the side braces forming a part of the seat support. Figs. 16, 17 and 18 are detail views of the preferred form of lock. Fig. 19 is a plan view of the seat and its associated parts and Fig. 20 is a plan view of the preferred manner of arranging suitable receptacles for such articles as it may be desired to carry.

In the drawings, 1, 1 represent substantially duplicate parts of a suitable receptacle, preferably in the form of a suit-case, and provided with suitable hinged connections 2, 2, which will permit the parts to fold together back to back, as shown in Figs. 4 and 5.

3 is a suitable lock secured upon one of said parts and coöperating with a suitable member secured upon the other part, the two being so arranged as to firmly lock the parts when in the closed position shown in Fig. 1, or when the parts are opened back to back as shown in Figs. 4 and 5. In one part of the receptacle is arranged a pair of wheel supports which preferably consist of bars 5, 5, pivotally connected to the body as at 6, 6, and preferably connected to one another by a lazy tongs construction consisting of a slot 7, in one member and a coöperating pin 8 in the other. Each pair of bars, 5, 5, carries a pair of wheels 9, 9, and projecting parts 10 arranged to snugly engage sockets 11—11 carried on the side of the body. By this means the supports 5, 5, may be opened outward and then moving upon the slot and pin connection the projections 10 may be forced down into the sockets 11 firmly fixing the supports and wheels in position for operative use. It will be noted that by the preferred slot and pin connection referred to, or an equivalent connection, the wheels may be readily folded into the body, and when they are opened outward into operative use, the tread of the wheels is extended giving a larger area of support upon the wheels.

When the wheels have been suitably positioned for use as described, the device may be turned over to rest upon them as shown in Fig. 7 and the seat frame which is constructed to fold up within the other half of the body may be opened outward.

As shown in Fig. 7, the seat is partially open, the main support 12 being shown in a partially upright position, and the brace supports 13, 13, being partially raised. It will be noted that the member 12 is pivotally supported upon the body at 14 while one of the brace members on each side is pivotally supported upon the body at 15, and the other to the main seat support 12 at 16, the two members being pivotally connected at 17. One of said members, as at 18, is provided with a spring latch which is preferably automatically engaged when the parts are opened out into operative position, by a groove 19 formed in the extended end of the other brace member. As shown in Fig. 8, the seat support is in operative position and the seat 20 is supported upon the brace members 13, 13. In the preferred form the seat is detachable from said parts, and all except the seat proper 20 is flexible, permitting it to be adjusted to assume different positions. As shown in Figs. 8 and 9, the hooks 22 on the sides of the seat back engage suitable eyes 23 on the braces to maintain the parts in proper position, while the front part of the seat proper is supported by links 24—24 engaging the braces 13 at 25. By this construction, the braces which are preferably of spring metal, serve as springs for the support of the seat and to reduce any shock or jar caused by the cab running over an obstruction. As shown in Figs. 11 and 12, the seat is adjusted to assume another position in which the depending portion 26 shown in Fig. 8 is extended, and by suitable hooks 26-½ engages an eye 27 on the main support 12, while the hooks shown in Figs. 8 and 9 are released from the eyes 23 and additional hooks 28 secured upon the member 26 engaging said eyes 23, as shown. By this means, the child may assume a partly reclining position. The preferred form of seat is further shown in Fig. 19 the part 29 folding down as a flap on the front edge of the seat, as shown in the drawings. The part 30 shown in Fig. 10 is preferably of leather or other suitable material and is adapted to close the spaces on the side of the seat when the latter is in operative position. It may be stitched or otherwise secured to the seat or to the braces as preferred, the construction being such that it will readily fold within the body when the parts are closed therein.

At the rear of the body beneath the seat may be arranged suitable means for retaining such articles as may be desired. As shown in Fig. 20, three such receptacles are shown each substantially in the same form consisting of substantially a flexible envelop form arranged to button or otherwise be secure to retain the articles therein. As shown, the extending flaps 31, 31, are arranged to fold over and the button-holes 32 therein engage the buttons 33 upon the opposite flap. At the rear is shown a receptacle for a nursing bottle or the like, formed in substantially the same manner. For the purpose of reducing the weight, the frame of the receptacle is preferably formed of a plate with parts cut away, as shown in Figs. 2, 4 and 20, at 34, or an equivalent construction composed of bars or other means. 35 is a handle centrally positioned between the two parts 1, 1, for carrying the device when it is closed.

When it is desired to transport the device the connection between the braces 13, 13 is broken by disconnecting the spring catch 18 from the notch 19 and they are folded downward as shown in Fig. 7, permitting the main seat support 12 to close within the body where if desired it may be secured in any preferred manner. As shown, the hook 36 Fig. 4 or equivalent means engages the cross-bar 37, firmly holding the same in its closed position within the body. The device may then be set upon end and the wheel frames disengaged from their connections and the wheels folded within that part of the body and if desired secured in such position in any preferred manner, as by a hook 38 (Fig. 2) or equivalent means. The lock 3 is then disengaged from the catch 4, and the body parts connected by the hinges 2 may be reversed closing the device, and the lock 3 engaged to lock them together when the device will appear substantially as in Fig. 1.

It will be seen that the lock is reversible and centrally pivoted upon one of the parts of the body as at 39 (Fig. 17). In the preferred form the part 3 is provided with extensions 40 extending from each face thereof, adapted to be seated within suitable slot openings in a plate on the other part of the body, where a spring-operated bar or latch member 41 controlled by the button sliding 4, heretofore referred to as a latch member, is adapted to engage the slots 42 then in registry therewith. To release the lock it is only necessary to press the button 4 back sufficiently to disengage the bar 41 from the slots 42 when the part 3 may be reversed, swinging under the handle 35, and the extensions 40 on the opposite side thereof be in position to engage the coöperating parts when the body parts 1—1 are assembled in reversed position back to back as shown in Figs. 4 and 5.

In the preferred construction, the hinges 2 are constructed with a body connection between the pivoted portions of a length substantially corresponding to the depth of one-half of the body part. The hinges are secured to the opposite edges of the two body parts, as shown in Figs. 3 and 4, permitting the ready assembling of the parts either in the position shown in Fig. 1, where the body is closed in the form of a suit case or valise, or when those parts are assembled back to back, as shown in Figs. 4 and 5. It is of course understood that the extension 26 on the seat, shown in Fig. 8 may be secured to the adjacent part in any preferred manner to give the whole a neat and compact appearance. It is shown in said figure to illustrate the construction. It is also apparent the other parts may be modified or the position of connecting parts be reversed to add to the attractiveness or convenience of the device, and that other immaterial modifications may be made without departing from the spirit of my invention. Hence I do not wish to be understood as limiting myself to the exact form and arrangement shown.

What I claim as new and desire to secure by Letters-Patent is,—

1. In a device of the kind described, a receptacle comprising substantially duplicate parts pivotally connected to open back to back, and means for locking the two in both their closed and open position, in combination with wheel-supporting means and wheels therefor arranged to fold into one of said parts and means for operatively engaging said supports with said parts, and a seat-support and seat therefor, for the coöperative part arranged to fold therein and means for operatively engaging said support with said coöperative part.

2. In a device of the kind described, a receptacle comprising the body part and the lid therefor pivotally connected thereto to open back to back, and means for locking the same in both its closed and open position, in combination with wheel-supporting means and wheels therefor pivotally connected to one part arranged to fold within the said part and means for operatively engaging said supporting means with said part, a seat support and seat therefor connected to the coöperating part arranged to fold therein and means for operatively engaging said seat support with said coöperating part.

3. In a device of the kind described, a receptacle comprising a body part and a cover pivotally connected thereto to open back to back, and means for locking the two in both their closed and back to back positions, in combination with wheel supporting means pivotally connected to one part provided with wheels arranged to fold within said part and means for maintaining said wheels in open operative position, a seat support pivotally connected to the coöperating part of the receptacle and a seat therefor arranged to fold into said part.

4. In a device of the kind described, a receptacle comprising a body part, a lid therefor pivotally connected thereto to open back to back, and means for locking the two in both their closed and open positions, in combination with wheel supporting means pivotally connected to one part provided with wheels, the wheels and supporting means being arranged to fold within said part and means for operatively engaging said supports with said part, a main seat support pivotally connected to the coöperating part and arranged to fold therein, and collapsible braces therefor provided with automatic locking means and arranged to support the seat thereon.

5. In a device of the kind described, a receptacle comprising a body part and a substantially duplicate lid therefor, the two being pivotally connected to open back to back, and means for locking the two in both their closed and open positions, in combination with wheel-supporting means and wheels therefor pivotally connected to one part and arranged to fold into said part means for maintaining the wheels in operative position, a seat support connected to the coöperating part arranged to fold therein, and a seat for said support provided with adjusting means whereby the position of the seat may be adjusted as desired.

6. In a device of the kind described, a receptacle comprising a body part, and a lid therefor, the two being pivotally connected to open back to back, and means for locking the receptacle in both its closed and open position, in combination with wheel supporting means and wheels therefor arranged to fold into one part, means for securing the wheels and support when folded therein and means for maintaining the same in operative position, a seat support and a seat therefor for the coöperating part arranged to fold therein, and means for securing said seat-support and seat in their folded position.

7. In a device of the kind described, a receptacle comprising substantially duplicate parts pivotally connected to open back to back and means for locking the receptacle in both its closed and open position, in combination with wheel supporting means and wheels therefor pivotally connected with one part and arranged to fold into said part, means for locking the wheels and support in operative position, and a seat support therefor connected with the coöperating part and arranged to fold therein.

8. In a device of the kind described, a receptacle comprising substantially duplicate parts pivotally connected to open back to back, and means for locking the same in both its closed and open positions, in combination with wheel supporting means pivotally connected to one of said parts, wheels therefor arranged to fold into said part with the supports, means for securing them in folded position and means for maintaining the wheels in operative position, a seat support pivotally connected to the coöperating part, a seat therefor, both arranged to fold into said part, and means for securing said support and seat in their folded position.

9. In a device of the kind described, a receptacle comprising a body part and a cover pivotally connected thereto to open back to back therewith, and means for locking said parts in both their closed and open positions, in combination with wheel supporting means provided with wheels arranged to fold transversely into said body, and means for operatively engaging said wheel supports with said body to maintain said wheels in operative position.

10. In a device of the kind described, a receptacle comprising a body and a cover pivotally connected thereto to open back to back therewith, and means for locking said parts in both their open and closed positions, in combination with wheel supporting means pivotally connected to said body, wheels for said supports the supports and wheels being arranged to fold transversely into said body, and means for maintaining said supports and wheels in open operative position.

11. In a device of the kind described, a receptacle comprising a body and a cover pivotally connected thereto to open back to back therewith, and means for locking said parts in both their closed and open positions, in combination with wheel supports and wheels arranged to close transversely into said body, means for maintaining said supports and wheels in operative engagement with said body, said wheel supports being constructed to increase the tread of the wheels on each side when in operative position.

12. In a device of the kind described, a receptacle comprising substantially duplicate parts pivotally connected to open back to back and means for locking the same in both its closed and open position, in combination with wheel supporting members and wheels therefor, said supporting parts being provided with extensions, sockets for said extensions arranged upon the side of the receptacle and a seat support and a seat therefor connected with the coöperating part of the receptacle and arranged to fold therein.

13. In a device of the kind described, a receptacle comprising substantially duplicate parts pivotally connected to open back to back, means for locking said parts both in their closed and open position, a folding wheel structure arranged to fold into one of said parts, and means for maintaining said wheel structure in operative relation to said part, in combination with a seat support comprising a main support pivotally connected to the other part of the body, jointed braces for the same on each side of the main support, automatic means for locking said braces in operative position, and a seat supported on said braces.

14. In a device of the kind described, a receptacle comprising substantially duplicate parts, means for securing said parts both in their closed and open positions and a wheel support and wheels arranged to fold into one of said parts, in combination with a seat support comprising the main support pivotally connected to the other part of the body, jointed braces for each side of the main support having one end secured to the body and the other to the said support, means for locking said braces in operative position, and an adjustable seat arranged to be wholly supported by said braces, or to be extended with one end engaging said main support.

15. In a device of the kind described, a receptacle comprising a body and a cover therefor pivotally connected to open back to back, in combination with a reversible lock comprising a hasp secured to one part and a coöperating latch on the other, arranged to operatively engage to lock the receptacle in both its closed and open positions.

16. In a device of the kind described, the body and a seat therefor comprising a main support 12 provided with folding brace supports 13—13, each being given a quarter twist to provide a spring support for a seat hung therefrom, and each having one end pivotally connected to the support 12 and the other end to the body part.

17. In a device of the kind described, a body in combination with a seat support therefor comprising the main support 12, provided with brace supports 13—13 each jointed between their ends and provided with automatic means for locking the braces when extended in a straight line, each brace being given a quarter twist to provide a spring support for the seat, and with one end pivotally connected to the support 12 and the other end to the body part.

18. A vehicle of the class described, comprising a body, composed of separate box-shaped parts adapted to be folded into two different positions, in one of which said body is closed, and in the other of which said parts are folded together back to back with the top and bottom parts open upwardly and downwardly respectively, the bottom part being provided with a running gear adapted to be folded thereinto, and the top part being provided with a flexible hammock member, folding supports for said hammock member adapted to hold it in two different positions, in one of which it serves as a seat and in the other as a bed, and a folding handle member, said hammock supports and said handle member being adapted to be folded into said top part.

In testimony whereof, I have hereunto signed my name in the presence of two subscribing witnesses.

GUY H. POWELL.

Witnesses:
S. W. VAN NOSTRAN,
A. E. CHAMBERLAIN.

Copies of this patent may be obtained for five cents each, by addressing the "Commissioner of Patents, Washington, D. C."